March 2, 1954
J. P. STANLEY
2,670,863
MATERIAL HANDLING APPARATUS
Filed Nov. 14, 1952
2 Sheets-Sheet 2
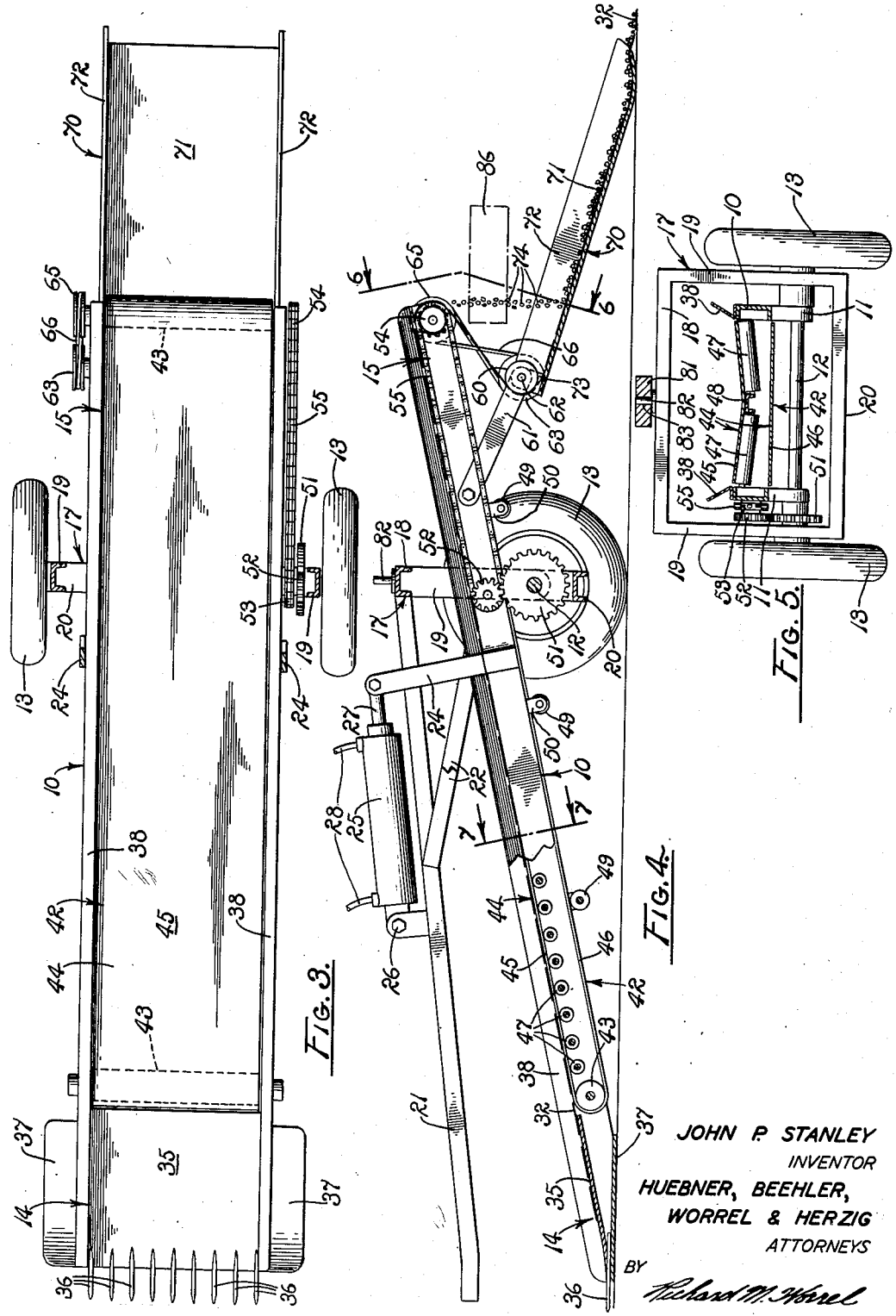
JOHN P. STANLEY
INVENTOR
HUEBNER, BEEHLER,
WORREL & HERZIG
ATTORNEYS
BY Patented Mar. 2, 1954

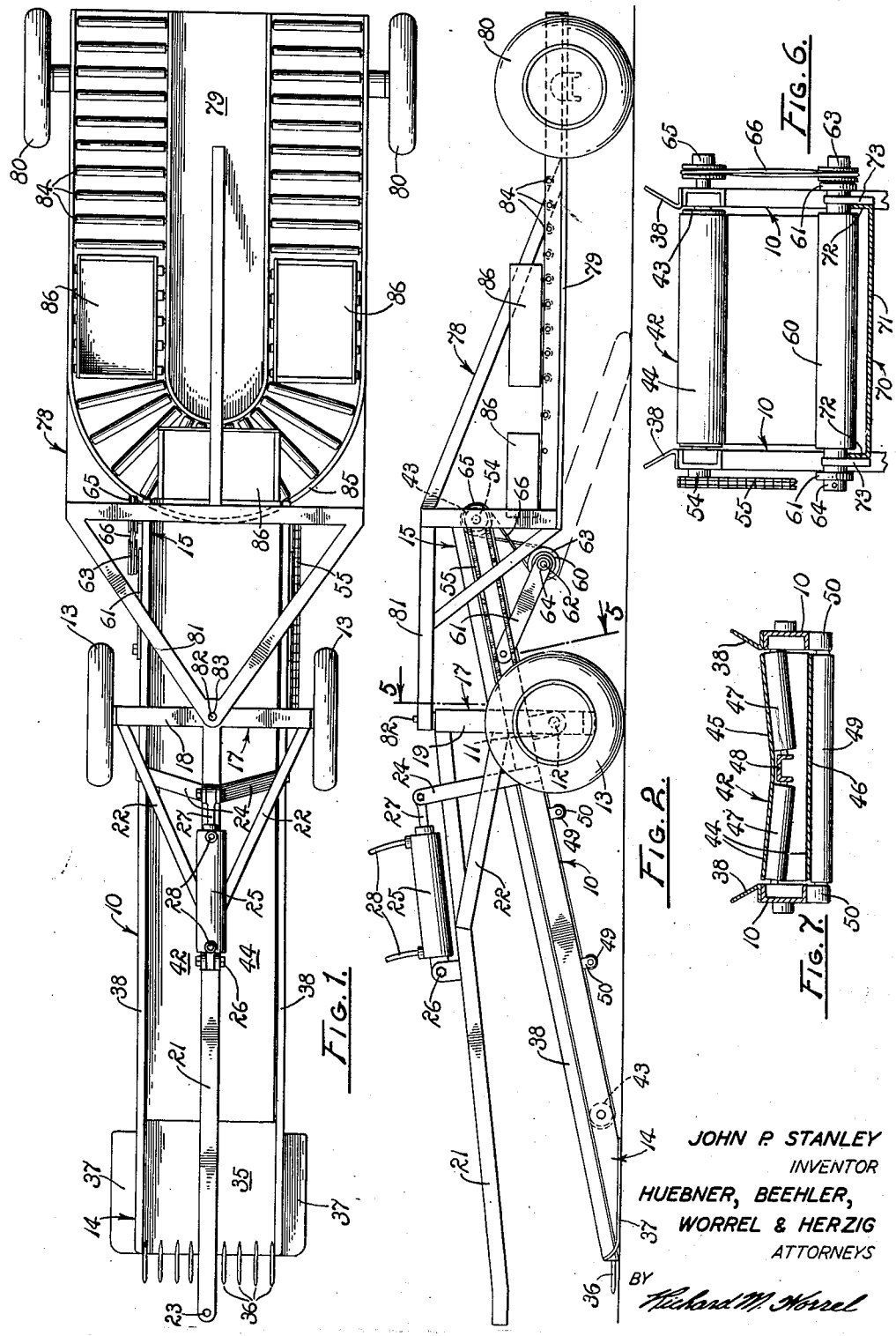

2,670,863

UNITED STATES PATENT OFFICE 2,670,863

MATERIAL HANDLING APPARATUS

John P. Stanley, Selma, Calif.

Application November 14, 1952, Serial No. 320,427

13 Claims. (Cl. 214—301)

The present invention relates to material handling apparatus and more particularly to a device especially suited to the picking up, turning and/or boxing of tray borne raisins and other agricultural produce.

Although the device of the present invention has many applications, its development was motivated by problems encountered in the production of raisins and it is conveniently illustrated in connection therewith.

To make raisins, grapes are usually picked from their vines and spread on rectangular paper trays rested on the ground between rows of vines. After exposure to the sun for a period sufficient partially to dehydrate, color, and cure the upwardly exposed surfaces of the grapes, it is necessary to turn the grapes so that the opposite sides thereof are exposed to the sun. The turning of the partially cured raisins on the paper trays is a slow, tedious and expensive process even for those skilled in the operation. Following further exposure to the sun, the trays are usually rolled with the raisins therein confined for further curing and moisture equalization. The rolling is also a slow, tedious and expensive operation. Finally, the raisins are manually dumped from their trays into boxes provided for the purpose. This operation, known as "boxing" together with the turning and rolling of the trays, constitutes a significant source of expense in raisin production. When it is observed that the cost of raisins to consumers is frequently ten times the sale price of the raisins by the farmer, the significance of lowering production costs is apparent. Further, it is known that the labor expenses involved in the harvest of grapes and their conversion into raisins is seldom less than fifty or sixty per cent of the farmer's sale price of the raisins and in many instances have been known even to approach and surpass such sale prices. Obviously, reduction in labor expenses reduces the farmer's hazards of operation, makes possible lower prices to the consumer, and by such lower prices, increases the demand.

Another difficulty in raisin production is the turning or boxing of the raisins in precisely the most advantageous condition. The slow and tedious character of the hand operations heretofore required for such purposes has made precise timing difficult where large scale production is involved.

Grapes suitable for raisins do not mature until the fall of the year. While spread on their trays, they are subject to serious deterioration by rain. It frequently happens that the raisins are nearly ready for boxing when an unseasonably early rain occurs. Manual boxing usually proves too slow an operation to save more than a fraction of the raisins exposed for drying when rain suddenly and unexpectedly occurs.

An object of the present invention is to provide a mechanical aid to the picking up, turning and/or boxing of tray borne raisins and the like.

Another object is to reduce the labor expenses incident to the production of raisins and the like.

Another object is to minimize the hazards involved in the production of raisins and the like by minimizing and speeding up the handling operations required.

Another object is to provide a fully automatic raisin turning device.

Another object is to provide a semi-automatic raisin boxing device.

Further objects are to provide improved elements and arrangements thereof in a device of the character and for the purposes set forth.

Still further objects and advantages will become apparent in the subsequent description in the specifications.

Referring to the drawings:

Fig. 1 is a plan view of an agricultural crop handling device embodying the principles of the present invention.

Fig. 2 is a side elevation of the device illustrated in Fig. 1.

Fig. 3 is a horizontal section of the device modified for raisin turning purposes and the like.

Fig. 4 is a vertical longitudinal section through the device in its modified condition as shown in Fig. 3.

Fig. 5 is a vertical transverse section through the device, as taken along line 5—5 in Fig. 2 of the drawing.

Fig. 6 is a fragmentary vertical transverse section through a rearward portion of the device, taken in the position represented by line 6—6 in Fig. 4 of the drawing.

Fig. 7 is a vertical transverse section taken through the main frame and belt conveyor portion of the device, as it appears from line 7—7 in Fig. 4 of the drawing.

Referring in greater detail to the drawings:

The agricultural crop handling device of the present invention provides an elongated main frame 10 which has a pair of transversely aligned wheel brackets 11 extended downwardly therefrom. An axle 12 is journaled in the brackets transversely of the frame and has a wheel 13 attached to each of its ends at opposite sides of the frame. The frame has a forward end portion 14 and a rearward end portion 15 and the axle and wheels are preferably located at a position nearer the rearward end portion of the frame than the forward end portion thereof with the center of gravity of the frame forwardly of the axle. As will subsequently become more fully apparent, the forward end of the frame rides on the ground, or closely adjacent thereto, during operation.

A substantially erect auxiliary frame 17, best shown in Fig. 5, of rectangular form providing a top cross member 18, a pair of transversely spaced legs 19, and a lower cross member 20 is rotatably mounted on the axle with the cross members in substantially parallel relation thereto. An elongated draft tongue 21 is secured at one end centrally of the cross member 18 and extends substantially horizontally forwardly therefrom with struts 22 welded to and extending between the legs of the auxiliary frame and the tongue for bracing purposes. A connection opening 23 is provided in the forward end of the tongue whereby it may be attached in substantially fixed elevational position to a draft means, such as a tractor, not shown, to impart forward movement to the device.

The elevation of the forward end portion 14 of the main frame of the device relative to the tongue is accurately controlled by securing a pair of lever arms 24 to the sides of the frame which upwardly converge above the tongue 21. An hydraulic cylinder 25 is pivotally connected to the draft tongue at 26 and provides a piston rod 27, of the character well known in the type of contractile and extendable control ram shown. The piston rod is pivotally connected between the upper ends of the lever arms 24. Hydraulic control conduits 28 are connected to opposite ends of the cylinder and to any suitable source of operating fluid under pressure, not shown, providing controlled application of fluid under pressure to either end of the ram while bleeding fluid from the opposite end. Contraction and extension of the ram results in corresponding controlled lowering and raising of the forward end of the main frame relative to the draft tongue and to the supporting ground when the tongue is coupled in fixed elevation to a tractor or other draft appliance.

It is the conventional practice, in the drying of grapes to make raisins therefrom, to spread the grapes on as numerous, relatively small, rectangular paper trays as may be required to accommodate the crop. The trays are rested on the ground between rows of grape vines with the grapes disposed thereon for exposure to the sun. To employ the device of the present invention most advantageously, a continuous strip 32 of sheet paper is employed between adjacent rows of grape vines coextensive with the lengths of such rows. The strip constitutes an elongated tray which is rested on the ground and has the grapes spread thereon for drying purposes.

In the use of the device of the present invention, one end of such an elongated paper tray 32 is initially lifted onto the forward end 14 of the frame 10 and rested on a forward plate 35 attached to the frame. With the forward end of the main frame 10 rested on the ground, the forward edge of the plate is also in ground contact and the plate projects rearwardly and upwardly therefrom. A plurality of teeth 36 are secured, as by welding, to the forward edge of the plate and extend horizontally forwardly therefrom in substantially equal transverse spaced relation. A shoe or skid 37 is secured to opposite sides of the forward end of the main frame 10 and extends outwardly therefrom, projecting longitudinally substantially horizontally when the forward end of the frame is in ground contact. The forward ends of the shoes are curved upwardly in the manner of a sled runner to preclude their gouging into the ground. The shoes, riding on the surface of the ground, maintain the forward end of the main frame, the plate, and the teeth in light ground engagement or slightly above the surface of the ground. Side guides 38 extend in substantially parallel relation the full length of the main frame 10 at opposite sides thereof.

A driven belt conveyor 42 extends substantially the full length of the main frame 10 rearwardly of the plate 35. The conveyor comprises a pair of belt rollers 43, one immediately rearwardly of the forward plate 35 and the other axially parallel thereto at the rearward end of the main frame 10. The rollers are rotatably mounted transversely of the frame and have an endless belt 44 circuitously mounted thereon to provide an upper run 45 and a lower run 46. The upper run 45 of the conveyor belt is movably supported on two sets of upper idler support rollers 47. Each roller has an outer end journaled in the main frame 10 and an inner end journaled in the main frame 10 and an inner end journaled in a center support 48 secured longitudinally of the frame midway between its sides. The sets of rollers are on opposite sides of the support 48 and corresponding rollers of each set substantially aligned transversely of the conveyor. As best shown in Fig. 5, the inner ends of the rollers are lower than the outer ends thereof so that the upper run of the belt is supported in an upwardly disposed concave condition between the guides 38.

The lower run of the belt is supported on a plurality of lower support rollers 49 rotatably mounted in transversely aligned ears 50 extended downwardly from both sides of the main frame 10.

The conveyor belt is driven with its upper run 45 moving rearwardly of the frame at substantially the same speed as the forward movement of the frame in earth traversing movement by drive means to which reference is now made. A spur gear 51 is attached to the axle 12 to which the wheels 13 are secured. A pinion 52 is rotatably mounted on the side of the main frame 10 above the axle in constant mesh with the spur gear 51. A sprocket 53 is rotatable with the pinion on a common axis therewith and another sprocket 54 is rotatable unitarily with one of the belt rollers 43. An endless chain 55 extends circuitously around the sprockets 53 and 54. On motion of the frame in a forward direction, the belt 44 is driven by the spur gear 51, pinion 52, sprockets 53 and 54, and chain 55 so as to move the upper run of the belt rearwardly at the desired speed correlated to the speed of earth traversing movement of the device.

A tray roller 60 is rotatably mounted under and forwardly of the rearward end 15 of the main frame 10 on roller arms 61 pivotally mounted on the frame and rearwardly and downwardly extended from their mounting. The roller is nonrotatably and axially slidably mounted on an axle 62 journaled in the arms which provides a pulley 63 rigidly affixed to an end thereof. The nonrotational axially slidable mounting of the roller on the axle is achieved by complementary splines and grooves provided by the axle and roller or by any other suitable means. A removable collar 64 is mounted on an end of the axle and maintains the axle, roller arms and feed roller in assembled relation. Upon removal of the collar, the axle may be slid endwardly from the feed roller and roller arms so as to release the roller.

Another pulley 65 is secured concentrically to the rear belt roller with a crossed belt 66 mounted about the pulleys 63 and 65. On rotation of the wheels 13 incident to forward movement of the frame, the tray roller is rotated in a counterclockwise direction, as viewed in Fig. 4.

An elongated chute 70 is pivotally supported on the axle 62 and trails rearwardly therefrom having a rearwardly extended end rested on the ground. The chute is formed from sheet metal or the like and provides a flat bottom 71 and opposite vertical side members 72. Ears 73 are attached to the sides of the forward end of the chute through which the axle 62 extends in pivotally mounting the chute. It will be apparent that upon removal of the collar 64 the axle 62 may be withdrawn to free the chute or the feed roller, as desired.

The chute is utilized when it is desired to turn the grapes or raisins 74 on the tray during the drying process but another mechanism in the form of a trailer 78, shown in Figs. 1 and 2, is used when it is desired to remove the raisins from the trays and to deposit the same in boxes therefor. The trailer is provided with a bed 79 having a rearward end supported on a pair of rotatable wheels 80 and a forward end 81 supported on the auxiliary frame 17. A pin 82 extends upwardly from the auxiliary frame into an opening 83 formed through the forward end of the trailer bed so that the trailer may pivot horizontally relative to the frame 10 during earth traversing movement.

A U-shaped roller conveyor 84 is supported on the bed 79 with an arcuate portion 85 at its forward end located under the rearward end of the belt conveyor 42. Boxes 86 may be placed on the roller conveyor at either straight side thereof and be manually moved consecutively to the arcuate position of the roller conveyor to a position under the rearward end of the belt conveyor for filling purposes.

*Operation*

The operation and utility of the present invention are believed to be apparent and are briefly summarized at this point. Preliminary to the utilization of the device, grapes are picked and spread on the elongated tray 32 for exposure to the sun. After the lapse of a period sufficient to cure the exposed side of the layer of grapes, it becomes necessary to turn the grapes for the curing of the opposite side of the layer.

For this purpose, the device is assembled as shown in Figs. 3 and 4 of the drawings. The tractor 78 is detached and the feed roller 60 and the chute 70 are mounted on the axle 62, as described. The draft tongue is connected to a tractor or other draft means through the utilization of its connection opening 23. Such draft means and main frame 10 are aligned with the elongated paper tray and moved forwardly until one end of the tray may be placed onto the teeth 36, forward plate 35, and forward end of the conveyor 42. As the main frame 10 is drawn forwardly, the conveyor 42 moves the paper tray rearwardly in the device at a speed relative to the main frame substantially equal to the earth traversing velocity of the frame. When the end of the tray has moved rearwardly beyond the rearward end of the main frame, it is threaded downwardly around the rear belt roller 43 and forwardly and thence rearwardly under the tray roller 60. The tray is then extended rearwardly on the bottom 71 of the chute 70 and rested on the ground with raisins or other weight thereon to hold the tray in place.

Continued forward movement of the device causes the tray 32 to be drawn rearwardly on the belt conveyor 42, rearwardly under the rearward end of the conveyor, around the tray roller and rearwardly longitudinally of the chute 70. As the tray moves up the conveyor, the partially cured raisins, which it is desired to turn, are carried thereon. As the tray returns under the rearward end of the conveyor, it is inverted and dumps the raisins which cascade onto the portion of the tray passing rearwardly along the chute. The raisins are properly turned by the cascading action and are relocated in a layer on the tray. The side guides 72 preclude any significant loss of the raisins during the cascading and turning action. As the tray is drawn from the chute, the raisins redeposited thereon are disposed for further curing and the tray and raisins are returned to the ground support for an additional period of exposure to the sun.

The operation of the device for turning purposes is continuous and need not be interrupted except for the threading of each new tray therein as the turning of a new row is initiated.

When the raisins are sufficiently cured for boxing, the collar 64 is removed, the axle 62 withdrawn and the chute 70 is removed. The tray roller 60, axle 62, and collar 64 are returned to position so that the roller may act as a tray take-up roller. The trailer 78 is coupled to the auxiliary frame 17 by means of the pin 82, as previously described.

With the device conditioned as shown in Figs. 1 and 2, the main frame 10 is again aligned with a tray 32 bearing raisins to be boxed. The tray is laid upwardly over the teeth 36, plate 35 and upper run 45 of the conveyor 42 and the end of the tray wrapped about the roller 60. The device is drawn along the row and the tray is fed upwardly of the conveyor as before.

Reserve boxes 86 are rested on one of the legs of the roller conveyor 84 and a box 86 located directly below the rearward end of the belt conveyor 42. As the tray moves back under the rearward end of the belt conveyor and is taken up on the roller 60, the raisins 74 are dumped into the box located beneath the conveyor. When the box is filled, it is manually rolled to the opposite leg of the roller conveyor from the reserve boxes for subsequent removal and a new box positioned to receive the raisins. With proper attention, the boxing operation can be continuous and uninterrupted for the full length of the tray.

At the end of the row, the collar 64 is removed, the axle 62 withdrawn from the roller 60, and the tray wrapped about the roller removed for destruction or subsequent use as convenience suggests. The filled boxes are removed from the roller conveyor 84 and a new supply of empty boxes provided. The device is reconditioned for boxing operations and the operations continued, as described.

In many instances, raisins do not dry or cure uniformly. This may be due to variations in the quality of the grapes, variations in bunch sizes of layer thickness on the trays, shading of the trays by the grape vines, or other causes. Under such conditions it is preferable concurrently to utilize the chute 70 and the auxiliary trailer 78 and return the tray 32 to the ground as demonstrated in Fig. 4. An attendant, not shown, visually inspects the raisins as they are carried on a tray up the conveyor. When raisins which appear to be properly cured are dumped from the rearward end of the conveyor, he positions a box 86 below the conveyor to catch the same. When raisins which appear to be insufficiently cured are dumped from the rearward end of the conveyor, he moves the box to the side so that the raisins cascade through the roller conveyor 84 onto the tray in the chute for return to ground support and further exposure to the sun. Such raisins are boxed in a subsequent operation. The radial divergence of the rollers under the conveyor, observable in Fig. 1, accommodates return of raisins therethrough to the tray in the chute.

The device of the present invention has substantially reduced the labor expenses incident to the turning and boxing of raisins and the like making the same available to consumers at substantially reduced prices at a greater profit to the farmer. The speed with which vast quantities of raisins can be turned makes possible the production of raisins of improved quality. The speed with which the boxing operation is performed not only is conducive to timely boxing for highest quality but in the event of inclement weather makes possible prompt gathering to avoid damage by rain.

The device is economical to produce in relation to the savings and advantages made possible, durable in structure, speedily and easily adapted to its varied functions, and efficiently operable by even unskilled labor.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A material handling device adapted to pick up elongated flexible trays having material thereon and to dump the material from the trays so as to turn the same comprising an elongated frame, means mounting the frame for longitudinal earth traversing movement and pivotal elevational movement of a forward end thereof, tray pick up fingers mounted on the forward end of the frame and forwardly extended therefrom, an endless conveyor mounted in the frame having an upper run providing a forward end adjacent to the fingers and a rearward end rearwardly thereof, ground driven means having driving connection to the conveyor motivating the conveyor with the upper run thereof traveled rearwardly relative to the frame at a velocity substantially equal to the forward velocity of earth traversing movement of the frame, a tray roller rotatably supported on the frame forwardly and below the rearward end of the conveyor for tray engagement, and a drive linkage interconnecting the conveyor and the roller rotating the roller at a peripheral velocity substantially equal to the rearward travel of the upper run of the conveyor in the frame whereby trays picked up by the fingers and carried rearwardly by the conveyor are drawn by the roller forwardly beneath the rearward end of the conveyor to dump and turn material from the tray.

2. A device for picking up elongated trays rested on the ground and having raisins disposed thereon and dumping the raisins from the trays in a tumbling action to turn the same comprising an elongated frame, means mounting the frame for longitudinal earth traversing movement and adjustable elevational movement of a forward end thereof, tray pick up means mounted on the forward end of the frame and forwardly extended therefrom, an endless conveyor mounted in the frame having an upper run providing a forward end adjacent to the pick-up means and a rearward end rearwardly thereof, driving means having driving connection to the conveyor motivating the conveyor with the upper run thereof traveled rearwardly relative to the frame, driven means mounted below and forwardly of the rearward end portion of the conveyor adapted to draw trays picked up by the pick-up means and carried rearwardly on the upper run of the conveyor downwardly and forwardly from the rearward end portion of the conveyor, and means connected to the frame for earth traversing movement therewith disposed below the rearward end portion of the conveyor and adapted to receive raisins therefrom.

3. In a device for picking up elongated trays rested on the ground and having raisins disposed thereon and dumping the raisins from the trays in a tumbling action, the combination of a frame mounted for earth traversing movement, a conveyor mounted in the frame in substantial alignment with the direction of earth traversing movement and having a forward end adjacent to the ground and an elevated rearward end, means for picking up trays of raisins and directing them onto the forward end of the conveyor, a tray roller mounted below and forwardly of the rearward end of the conveyor, and driving means traveling the conveyor rearwardly in the frame and rotating the upper periphery of the roller forwardly in the frame at substantially the same velocity whereby trays are carried rearwardly on the conveyor and back under the rearward end thereof by the roller to dump raisins from the trays.

4. In a device for picking up elongated trays rested on the ground and having raisins disposed thereon and dumping the raisins from the trays in a tumbling action, the combination of a frame mounted for earth traversing movement, a conveyor mounted in the frame in substantial alignment with the direction of earth traversing movement and having a forward end adjacent to the ground and an elevated rearward end, means for picking up trays of raisins and directing them onto the forward end of the conveyor, a tray roller mounted below and forwardly of the rearward end of the conveyor, ground driven means traveling the conveyor rearwardly in the frame at a velocity substantially equal to the earth traversing speed of the frame and rotating the upper periphery of the roller forwardly in the frame at substantially the same velocity whereby trays are carried rearwardly on the conveyor and back under the rearward end thereof by the roller to dump raisins from the trays, a chute connected to the frame having a forward end adapted to receive trays from the roller and a rearward end adjacent to the ground for slidably returning the trays to the ground, the chute being disposed below the rearward end of the conveyor to catch raisins dumped therefrom on trays slidably returned to the ground, an auxiliary trailer pivotally coupled to the frame for earth traversing movement therewith in trailing relation thereto, and a substantially U-shaped roller conveyor having an arcuate portion of sufficient porosity to pass raisins therethrough disposed between the rearward end of the conveyor and the chute and rearwardly extended legs, said roller conveyor being adapted to receive boxes thereon for selective positioning under the conveyor to receive cured raisins therefrom and retracted from beneath the conveyor for return of improperly cured raisins through the conveyor to the trays for return to the ground.

5. A device for successively picking up elongated trays of raisins disposed on the ground for drying purposes, turning the raisins on the trays, and returning the trays with the turned raisins thereon to ground support for further drying comprising a frame mounted for earth traversing movement, means borne by the frame adapted to engage under and pick up the trays of raisins, a conveyor having a forward end disposed adjacent to the pick-up means to receive trays therefrom and an elevated rearward end, means having driving connection to the conveyor motivating the conveyor to carry trays from the forward end thereof to the rearward end, a tray roller rotatably mounted below and forwardly of the rearward end portion of the conveyor, a drive linkage interconnecting the conveyor and the roller rotating the roller with the upper periphery thereof traveled forwardly in the frame at substantially the same velocity as the rearward movement of the conveyor in the frame adapted to receive trays from the rearward end of the conveyor and draw the same forwardly under the conveyor to dump raisins therefrom, and a chute connected to the frame for earth traversing movement therewith having a forward end adapted to receive trays from the roller and a rearward end adjacent to the ground for slidably returning the trays to the ground, the chute being disposed below the rearward end of the conveyor to catch raisins dumped therefrom on trays slidably returned to the ground.

6. A device for turning raisins arranged on elongated paper trays comprising an elongated frame having forward and rearward end portions, an axle journaled transversely in the frame in adjacent spaced relation to the rearward end portion of the frame, ground driven wheels mounted on the axle in supporting relation to the frame, an auxiliary frame pivotally mounted on the axle and upwardly extended therefrom, a tongue connected to the auxiliary frame and forwardly extended therefrom over the elongated frame having a forward end portion adapted for connection to a draft appliance, adjustable means interconnecting the tongue and the frame whereby the elevation of the forward end portion of the frame relative to the tongue is controlled, pick up fingers mounted on the forward end portion of the elongated frame and forwardly extended therefrom adjacent to the surface of the ground adapted to pass under and pick up paper trays of raisins rested on the ground, an elongated endless conveyor mounted longitudinally of the frame having an upper run providing a forward end adjacent to the fingers adapted to receive paper trays of raisins from the fingers and a rearward end adjacent to the rearward end of the frame, a linkage having driven connection to the axle and driving connection to the conveyor circuitously motivating the conveyor with the upper run thereof traveled rearwardly in the frame at a velocity substantially equal to the earth traversing speed of the wheels, a pair of arms pivotally mounted on the elongated frame adjacent to the rearward end portion of the frame and downwardly and rearwardly extended from their pivotal mounting, a roller axle journaled substantially horizontally in the arms below and forwardly of the rearward end portion of the conveyor axially slidable for removal from the arms, a tray roller mounted concentrically on the axle axially slidable from the axle, means releasably holding the axle rotatably in the arms with the roller disposed therebetween and flexible tension drive means interconnecting the rearward end of the conveyor and the roller axle rotating the tray roller in a direction with the upper periphery thereof traveled forwardly of the frame at a peripheral speed substantially equal to the velocity of the conveyor and supporting the roller and the rearward end portions of the arms on the conveyor.

7. A device for turning raisins arranged on elongated paper trays comprising an elongated frame having forward and rearward end portions, an axle journaled transversely in the frame rearwardly of the center of gravity thereof, ground driven wheels mounted on the axle in supporting relation to the frame, an auxiliary frame pivotally mounted on the axle and upwardly extended therefrom, a tongue rigidly connected to the auxiliary frame and forwardly extended therefrom over the elongated frame having a forward end portion adapted for connection to a draft appliance in substantially fixed elevational position thereon, adjustable means interconnecting the tongue and the frame whereby the elevation of the forward end portion of the frame relative to the tongue is controlled, means mounted on the forward end portion of the elongated frame and forwardly extended therefrom adapted to engage under and pick up paper trays of raisins rested on the ground, an elongated endless conveyor mounted longitudinally of the frame having an upper run providing a forward end adjacent to the pick up means adapted to receive paper trays of raisins from said pick up means and a rearward end adjacent to the rearward end of the frame, a linkage having driven connection to the axle and driving connection to the conveyor traveling the upper run of the conveyor rearwardly in the frame at a velocity substantially equal to the earth traversing speed of the wheels, a pair of arms pivotally mounted adjacent to the rearward end portion of the frame and downwardly and rearwardly extended from their pivotal mounting, a tray roller rotatably mounted in the rearwardly extended arms below and forwardly of the rearward end portion of the conveyor, flexible tension drive means interconnecting the rearward end of the conveyor and the tray roller rotating the roller in the direction opposite to the direction of conveyor travel at a peripheral speed substantially equal to the velocity of the conveyor and supporting the roller and arms, and an elongated chute pivotally mounted concentrically to the axis of the roller and rearwardly sloped therefrom having a rearward end portion supported on the ground, said chute having a bottom substantially tangentially related to the lower periphery of the roller adapted to receive paper trays downwardly extended from the rearward end portion of the conveyor and rearwardly under the roller for receipt of raisins dumped at the rearward end of the conveyor.

8. A device for turning raisins arranged on elongated paper trays comprising an elongated frame having forward and rearward end portions, an axle journaled transversely in the frame in adjacent spaced relation to the rearward end portion of the frame, ground driven wheels mounted on the axle in supporting relation to the frame, an auxiliary frame pivotally mounted on the axle and upwardly extended therefrom, a tongue connected to the auxiliary frame and forwardly extended therefrom over the elongated frame having a forward end portion adapted for connection to a draft appliance, adjustable means interconnecting the tongue and the frame whereby the elevation of the forward end portion of the frame relative to the tongue is controlled, pick up fingers mounted on the forward end portion of the elongated frame and forwardly extended therefrom adjacent to the surface of the ground adapted to pass under and pick up paper trays of raisins rested on the ground, an elongated endless conveyor mounted longitudinally of the frame having an upper run providing a forward end adjacent to the fingers adapted to receive paper trays of raisins from the fingers and a rearward end adjacent to the rearward end of the frame, a linkage having driven connection to the axle and driving connection to the conveyor circuitously motivating the conveyor with the upper run thereof traveled rearwardly in the frame at a velocity substantially equal to the earth traversing speed of the wheels, a pair of arms pivotally mounted on the elongated frame adjacent to the rearward end portion of the frame and downwardly and rearwardly extended from their pivotal mounting, a roller axle journaled substantially horizontally in the arms below and forwardly of the rearward end portion of the conveyor axially slidable for removal from the arms, a tray roller mounted concentrically on the axle axially slidable from the axle, means releasably holding the axle rotatably in the arms with the roller disposed therebetween, flexible tension drive means interconnecting the rearward end of the conveyor and the roller axle rotating the tray roller in a direction with the upper periphery thereof traveled forwardly of the frame at a peripheral speed substantially equal to the velocity of the conveyor and supporting the roller and the rearward end portions of the arms on the conveyor, the rearward end portion of the conveyor being adapted to have an elongated paper tray returned thereunder and downwardly extended forwardly and thence about the forward and lower peripheral portions of the roller, and an elongated chute pivotally mounted on the roller axis and rearwardly sloped therefrom having a rearward end portion supported on the ground, said chute having a bottom substantially tangentially related to the lower periphery of the roller adapted to receive paper trays extended rearwardly under the roller.

9. A device for successively picking up elongated trays of raisins disposed on the ground for drying purposes, boxing cured raisins from the trays, turning the incompletely cured raisins on the trays, and returning the trays with the turned incompletely cured raisins thereon to ground support for further drying comprising a frame mounted for earth traversing movement, fingers borne by the frame adapted to engage under and pick up the trays of raisins, a conveyor having a forward end disposed adjacent to the fingers to receive trays therefrom and an elevated rearward end, ground driven means having driving connection to the conveyor motivating the conveyor to carry trays from the forward end thereof to the rearward end at a velocity relative to the frame substantially equal to the earth traversing speed of the frame, a tray roller rotatably mounted below and forwardly of the rearward end portion of the conveyor, a drive linkage interconnecting the conveyor and the roller rotating the roller with the upper periphery thereof traveled forwardly in the frame at substantially the same velocity as the rearward movement of the conveyor in the frame adapted to receive trays from the rearward end of the conveyor and draw the same forwardly under the conveyor to dump raisins therefrom, a chute connected to the frame for earth traversing movement therewith having a forward end adapted to receive trays from the roller and a rearward end adjacent to the ground for slidably returning the trays to the ground, the chute being disposed below the rearward end of the conveyor to catch raisins dumped therefrom on trays slidably returned to the ground, an auxiliary trailer pivotally coupled to the frame for earth traversing movement therewith in trailing relation thereto, and a substantially U-shaped roller conveyor having an arcuate portion of sufficient porosity to pass raisins therethrough disposed between the rearward end of the conveyor and the chute and rearwardly extended legs, said roller conveyor being adapted to receive boxes thereon for selective positioning under the conveyor to receive cured raisins therefrom and retracted from beneath the conveyor for return of improperly cured raisins through the conveyor to the trays for return to the ground.

10. A material handling device adapted to have elongated flexible trays having material thereon traveled therethrough to dump the material from the trays comprising an endless conveyor having an upper run and opposite ends, driving means connected to the conveyor traveling the upper run thereof from one end of the conveyor to the other, means for guiding such trays onto the end of the conveyor from which the upper run is traveled, a tray roller rotatably mounted below the end of the conveyor toward which the upper run thereof is traveled and spaced from said end toward the opposite end of the conveyor, and driving means connected to the roller rotating the roller at a peripheral velocity substantially equal to the velocity of travel of the upper run of the conveyor whereby trays guided onto the conveyor and carried thereby are drawn by the roller back beneath the end of the conveyor to turn material from the tray.

11. A material handling device adapted to pick up elongated flexible trays having material thereon and to dump the material from the trays comprising an elongated frame, means mounting the frame for longitudinal earth traversing movement and adjustable elevational movement of a forward end thereof, means mounted on the forward end of the frame adapted to engage such elongated flexible trays and guide the same upwardly into the frame, an endless conveyor mounted in the frame having an upper run providing a forward end adjacent to the tray engaging means and a rearward end rearwardly thereof, driving means having connection to the conveyor motivating the conveyor with the upper run therefor traveled rearwardly in the frame, a tray roller rotatably supported on the frame forwardly and below the rearward end of the conveyor for tray engagement, and driving means connected to the roller rotating the roller at a peripheral velocity substantially equal to the rearward travel of the upper run of the conveyor in the frame.

12. In a device for picking up elongated trays rested on the ground and having raisins disposed thereon and dumping the raisins from the trays in a tumbling action, the combination of a frame mounted for earth traversing movement, a conveyor mounted in the frame in substantial alignment with the direction of earth traversing movement and having a forward end adjacent to the ground and an elevated rearward end, means for picking up trays of raisins and directing them onto the forward end of the conveyor, a tray roller mounted below and forwardly of the rearward end of the conveyor adapted to have trays return traveled thereabout, driving means connected to the conveyor traveling the conveyor rearwardly in the frame whereby trays are carried rearwardly on the conveyor and back under the rearward end thereof by the roller to dump raisins from the trays, and a chute connected to the frame having a forward end adapted to receive trays from the roller and a rearward end adjacent to the ground for slidably returning the trays to the ground, the chute being disposed below the rearward end of the conveyor to catch raisins dumped therefrom on trays slidably returned to the ground.

13. A device adapted to have elongated flexible trays having raisins disposed thereon for drying purposes traveled therethrough to turn the raisins on the trays for continued drying thereof comprising an endless conveyor having an upper run and opposite ends, driving means connected to the conveyor traveling the upper run thereof from one end of the conveyor to the other, means for guiding such trays bearing raisins onto the end of the conveyor from which the upper run is traveled, a tray roller rotatably mounted below the end of the conveyor and spaced from said end toward the opposite end of the conveyor, driving means connected to the roller rotating the roller at a peripheral velocity substantially equal to the velocity of travel of the upper run of the conveyor whereby trays guided onto the conveyor and carried thereby are drawn by the roller back beneath the end of the conveyor to turn the raisins from the tray, and guide means mounted adjacent to the roller in substantial alignment with the conveyor having an end adapted to receive trays from the roller and an end extended therefrom for slidable discharge of the trays, the guide means having a tray receiving end disposed below the end of the conveyor toward which the upper run thereof travels to catch raisins dumped therefrom on trays slidably traveled along the guide means for discharge therefrom.

JOHN P. STANLEY.

References Cited in the file of this patent

UNITED STATES PATENTS

| Number | Name | Date |
|---|---|---|
| 1,015,390 | Mighill | Jan. 23, 1912 |